United States Patent [19]
Reinauer et al.

[11] Patent Number: 5,599,145
[45] Date of Patent: Feb. 4, 1997

[54] DRILL WITH INTERCHANGEABLE CUTTING INSERT

[75] Inventors: Josef Reinauer, Sigmaringen; Hans G. Kuhl, Villingen, both of Germany

[73] Assignee: Joerg Guehring, Albstadt, Germany

[21] Appl. No.: 424,509

[22] PCT Filed: Nov. 8, 1993

[86] PCT No.: PCT/EP93/03118

§ 371 Date: Aug. 11, 1995

§ 102(e) Date: Aug. 11, 1995

[87] PCT Pub. No.: WO94/12305

PCT Pub. Date: Jun. 9, 1994

[30] Foreign Application Priority Data

Nov. 23, 1992 [DE] Germany .................. 42 39 311.6

[51] Int. Cl.⁶ .............................. B23B 51/00; B23B 51/06
[52] U.S. Cl. ........................ 408/233; 408/57; 408/229; 408/713
[58] Field of Search ............................. 408/223, 224, 408/227–231, 233, 713, 57, 59; 407/40, 42, 47

[56] References Cited

U.S. PATENT DOCUMENTS

| | | | |
|---|---|---|---|
| 4,475,853 | 10/1984 | Morgan | 409/137 |
| 4,493,596 | 1/1985 | Grunsky et al. | 408/231 |
| 4,744,704 | 5/1988 | Galvefors | 408/713 |
| 4,768,901 | 9/1988 | Reinauer et al. | 408/227 |

FOREIGN PATENT DOCUMENTS

| | | |
|---|---|---|
| 0441302 | 8/1991 | European Pat. Off. . |
| 2074491 | 10/1971 | France . |
| 2126620 | 10/1972 | France . |
| 2317989 | 2/1977 | France . |

*Primary Examiner*—Steven C. Bishop
*Attorney, Agent, or Firm*— Oblon, Spivak, McClelland, Maier & Neustadt, P.C.

[57] ABSTRACT

A drill includes a substantially cylindrical holder (10) with a longitudinal axis (X) and a transverse axis (Y) perpendicular thereto, a drill tip (12) in which there is a groove (14) running along the transverse axis (Y) with a groove bottom (16) and groove sides (18',18"), and a cutting insert fitted in the groove having two main cuts (26',26") with forwardly adjacent cutting surfaces (32',32") and two rear surfaces (30',30") opposite a cutting surface on the other side of the transverse axis (Y). The holder has two bores (20',20") in a radial plane (R) of the drill, each of which is in the region of a rear surface (30',30") of the insert (25) and opens into a groove side (18',18"). The longitudinal axes (24',24") of the drillings (20',20") run at an acute angle to the groove side (18',18") and the adjacent rear surface (30',30") of the insert (25). Stops (50',50") projecting from a groove side surface (18',18") are arranged in the bores (20',20"), and at least one of the two stops (50") can move towards the longitudinal axis (24") of the bore (20"). Recesses (34',34") forming supporting surfaces (38',38") corresponding to the stops (50',50") are formed in the rear side surfaces (30',30") of the insert (25).

21 Claims, 3 Drawing Sheets

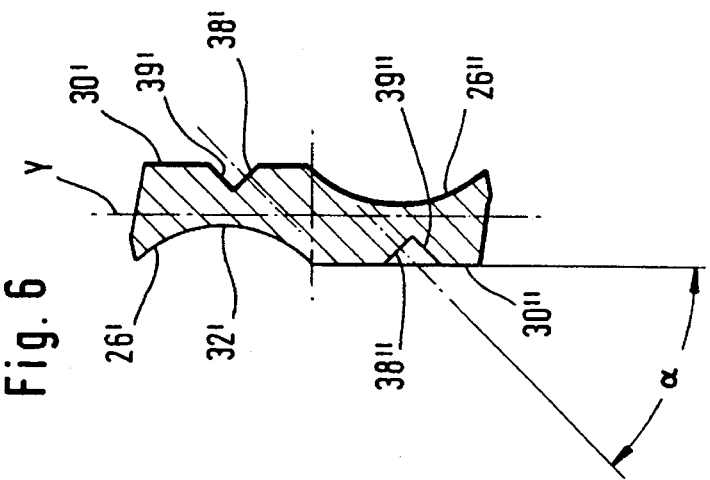
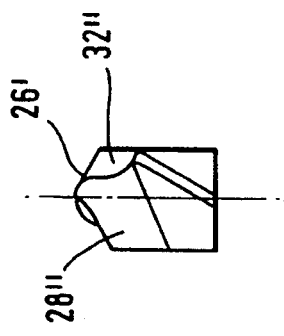
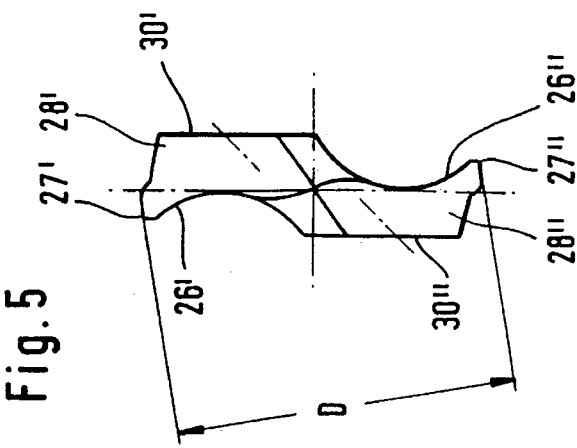
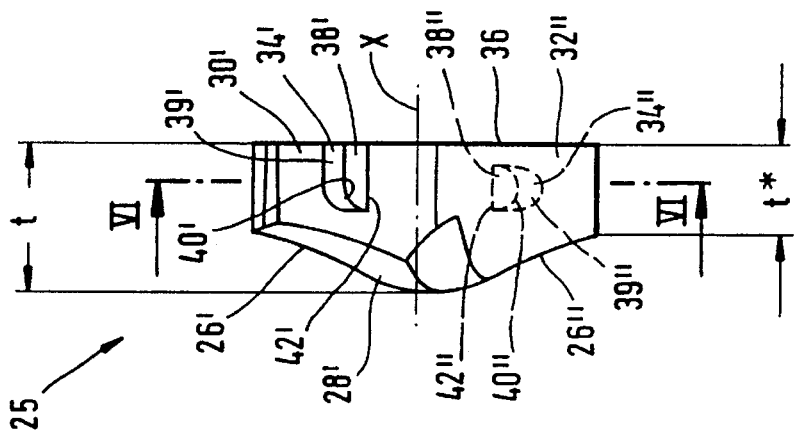

DRILL WITH INTERCHANGEABLE CUTTING INSERT

TECHNICAL FIELD

The invention pertains to a drill consisting of an essentially cylindrical holder with a longitudinal axis and a transverse axis that extends perpendicular to the aforementioned longitudinal axis, a drill tip, inside of which a groove with a groove bottom and groove side walls is arranged such that it extends along the transverse axis, and a cutting insert, in particular consisting of hard metal, that is arranged in the groove and has two main cutting edges that are arranged point-symmetric to the longitudinal axis and essentially parallel to the transverse axis, two forwardly adjacent cutting surfaces and two rear side surfaces that are arranged opposite to each respective cutting surface on the other side of the transverse axis.

BACKGROUND ART

One such drill is known from the relevant state of the art, namely German U.S. Pat. No. 4,493,596. The drill described in this publication is provided with fastening elements in the form of screws that hold the cutting insert in the groove of the shaft, namely by being screwed down against the groove side walls. For this purpose, the cutting insert is provided with at least one bore that is arranged perpendicular to the transverse axis and perpendicular to the longitudinal axis of the drill, with a screw passing through said bore. In this case, the screw head is preferably realized as a countersunk head that lies in a corresponding counterbore of the cutting insert in such a way that the screw head is flush with the surface of the cutting insert or countersunk in said surface. However, in one preferred embodiment with two bores, the screw is arranged in such a way that the screw head lies in one cutting surface, with a threaded screw shaft exiting the rear side surface of the cutting insert that is situated opposite to the cutting surface and engaging into a threaded bore arranged in the corresponding groove side wall. The central axes of the bores provided in the cutting insert for accommodating the fastening screws as well as the central axes of the threaded bores provided in the groove side walls for accommodating the threaded part of the fastening screws are in this case arranged somewhat offset to one another such that when inserting a screw provided with a countersunk head, as force is exerted that moves the cutting insert in the direction toward the groove bottom such that it adjoins said groove bottom.

However, the previously described state of the art is associated with the disadvantage that the screw heads that are arranged in the cutting surfaces of the cutting insert impair the direct discharge of the chips. In addition, the bores provided in the cutting insert for accommodating the fastening screws weaken the cutting insert, so that the cutting insert must have a relatively large extent in the longitudinal direction of the drill in order to compensate for the aforementioned weakening. According to the relevant state of the art, the ratio between the diameter of this drill, i.e., the distance of the adjacent cutting edges to one another, and the height of the cutting insert is relatively small. At a given diameter, this leads to a relatively large extent of the cutting insert in the longitudinal direction of the drill and consequently a weakening of the tip of the drill U.S. Pat. No. 4,768,901 discloses a drilling tool with two or more cutting edges in which interchangeable cutting elements are fastened in correspondingly designed recesses in the drill tip by means of screws. In this case, the interchangeable cutting elements are provided with fastening sections that are situated behind the main cutting edge, as viewed in the cutting direction. Each respective fastening section is provided with a bore that accommodates the screws which engage into threaded bores that are arranged in the face side of the drill tip and extend parallel to the drill axis. According to this state of the art, the fastening screws are arranged parallel to the drill axis, with a separate cutting element or a separate cutting insert being provided for each respective main cutting edge. This state of the art is also associated with the disadvantage that the fastening screws extend through bores in the cutting insert, so that bores that limit the geometric design possibilities and require a correspondingly large size of the cutting inserts need to be provided in the cutting elements.

DESCRIPTION OF THE INVENTION

Starting from the relevant state of the art, the present invention is based on the objective of creating a drill with an interchangeable cutting insert, in which the insert is held in a transversely extending groove in the drill tip without requiring bores in the cutting insert and which, with respect to its dimensions, can be realized in such a way that the drill tip of the holder is weakened as little as possible. The invention should have the broadest possible range of applications and, in particular, be suitable for cutting different materials with all conventional drill geometries.

With a drill according to the relevant state of the art, the solution to the aforementioned objective is characterized by the fact that the holder of the drill is provided with two bores that respectively exit into one groove side wall, preferably lie in one radial plane of the drill and are respectively arranged within the region of one rear side surface of the cutting insert, with the longitudinal axes of the bores respectively extending at an acute angle to the respective groove side wall and the adjacent rear side surface of the insert, that stopping elements that respectively protrude from one groove side wall are arranged in the bores, that at least one of the two stopping elements can be moved in the direction of the longitudinal axis of the bore, and that recesses which form support surfaces that correspond the stopping elements are arranged or formed in the rear side surfaces of the insert.

In order to realize a point-symmetric shape, it is preferred that the longitudinal axis of the bores provided in the shaft of the drill for accommodating the stopping elements be arranged at the same acute angle to the respective groove side wall and the respective adjacent rear side surface of the cutting insert, and that the longitudinal axes of the bores have the same distance from the longitudinal axis of the drill or the holder. In addition, at least one movable stopping element is preferably realized in the form of a screw, in particular a headless screw, with a hexagonal socket.

Due to the design according to the invention, the cutting element need not be provided with a continuous bore. The shape of the cutting element is extremely simple, i.e., the processed volume of the cutting element is minimized. Instead of the bores that, according to the state of the art, extend perpendicular to the transverse axis as defined in the generic portion of the claim, the drill according to the invention is only provided with recesses that form support surfaces, the normal lines to which do not extend perpendicular to the transverse axis, as is the case with the state of the art, but rather they intersect said transverse axis at an acute angle. In cooperation with the stopping elements that, according to the invention, are arranged in bores in the holder of the drill, this provides a fastening possibility in which the cutting insert is not weakened and consequently can be realized in a correspondingly flat fashion, i.e., the cutting insert can have small dimensions in the longitudinal direction of the drill. Consequently, the fastening method according to the invention is suitable for all conceivable cutting edge geometries, namely, even such cutting edge geometries in which the extent of the cutting edge requires a local reduction in the thickness of the cutting element.

In order to fasten the cutting element, said cutting element is inserted into the groove and at least one movable stopping element is in a second step displaced toward the inside from the outer side of the drill shaft. It is preferred that a stopping element in the form of a headless screw be used. Since the respective bores exit into one groove side wall within the region of one rear side surface of the insert and form an acute angle with the groove side wall, the intersecting point between one respective longitudinal axis of a bore and the transverse axis lies on the respective other side relative to the longitudinal axis of the drill. When tightening the stopping elements or, if only one movable stopping element is provided, the stopping element, a torque is exerted on the cutting insert, with the direction of rotation of said torque being identical to that of the torque that is generated during the drilling process on the cutting edges of the drill due to the reaction forces. As a consequence of the torque generated, both rear side surfaces of the cutting insert are pressed against the corresponding groove side walls within their outer edge regions and adjoin the groove side walls. The forces exerted upon the cutting edges are absorbed at this location.

Since the stopping elements are arranged at an angle, a displacement of one stopping element in the direction of the longitudinal axis of the bore accommodating the stopping element leads to the fact that, due to the contact between one end face of the stopping element and the corresponding support surface in the corresponding rear side surface of the insert, the cutting insert is displaced in the direction of the transverse axis by a corresponding vector component until this movement is compensated by a corresponding counter-movement of the other stopping element. This measure makes it possible to realize a simple centering of the cutting insert relative to the longitudinal axis of the drill. With a point-symmetric arrangement of the stopping elements, which in this case preferably lie in one common radial plane, the adjustment is realized in a particularly simple and reliable fashion.

According to one additional preferred embodiment, it is proposed that the support surfaces be realized in planar fashion and limited by an edge in the form of a sector of a circle. With respect to the manufacturing technology, this measure makes it possible to produce the support surfaces or the recesses forming said support surfaces in a particularly simple fashion by means of a milling cutter. In addition, it is also advantageous if at least one recess that forms a support surface extend up to the back of the cutting insert, i.e., up to the edge that faces the groove bottom. This measure makes it possible to pull the cutting insert out of the groove in the holder that accommodates the cutting insert without having to entirely unscrew or retract the corresponding stopping element from the groove region. This measure is particularly advantageous if one stopping element is realized as an immovable stopping element or a stopping element that can be moved along the axis.

In particular in the latter instance, it is possible to use a stopping element that consists of a headless screw, the length of which is shorter than the length of the bore that is arranged in the holder for accommodating said screw such that a counter sunk screw in the form of a short headless screw with a hexagonal socket can be arranged in the remaining space that faces the outer side of the drill. This measure creates a stopping element that need only be adjusted once since its position no longer needs to be altered once the cutting insert has been centered. A recess of the previously described type can be arranged in the rear side wall of the cutting insert that faces this stopping element, namely, a recess that extends up to the edge of the cutting insert which faces the groove.

A corresponding recess can also be provided on the opposite side of the cutting insert, i.e., on the other rear side surface. However, this recess does not extend up to the groove bottom, so that the cutting insert is prevented from falling out once the stopping element, i.e., the headless screw, has been screwed in. Such an asymmetric design of the recesses provides the additional advantage that an erroneous insertion of the cutting element is not possible as long as the fixed, once adjusted stopping element is not altered.

According to one additional preferred embodiment, it is proposed that the longitudinal axes of the bores that accommodate the stopping elements, e.g., the headless screws, be arranged somewhat offset to the support surfaces arranged in the rear side surfaces of the cutting insert, so that the end faces of the stopping elements, e.g., the end faces of the headless screws, only partially cover the support surfaces arranged in the rear side surfaces. This measure insures that the headless screws comparable stopping elements only contact the support surfaces with part of the end face, the relative movement of which is directed toward the groove bottom while being screwed in. A force is exerted upon the cutting insert in this fashion, with said force pulling the cutting insert toward the groove bottom such that a defined seat of the cutting insert in the groove is attained during assembly.

The design of the drill tip holder according to the invention is suitable for all conventional cutting edges, drill cross sections and drill tip geometries. This is primarily realized due to the fact that the functional surfaces that are required for fastening the insert and arranged on the insert as well as the holder are designed as simply as possible, and that the volume of the cutting insert as well as the cutting volume on the holder can be minimized in this fashion.

Good results in the cutting of high-strength materials, for example, can be attained if the shaft of the drill is provided with flutes that terminate within the region of the cutting surfaces of the cutting insert and turn into said cutting surfaces of the cutting insert in flush fashion.

When cutting tenacious and high-strength materials, it is advantageous if the cutting surface be curved in concave fashion. However, it is also possible to curve the main cutting edges in such a concave fashion. In this case, the fastening geometry can remain unaltered due to the design of the cutting insert holder according to the invention. The cutting element is not additionally weakened within the region of the concave surface due to the transverse arrangement of the bores for accommodating the clamping and stopping elements. The proper selection of the angle between the bore axis for the clamping and stopping elements and the groove support surface makes it possible to generate a torque that is directed opposite to the cutting direction of the drill and consequently already insures a close fit of the cutting element in the slot beginning with the initial adjustment during which the cutting elements are adjusted and tightened.

The design of the fastening arrangement according to the invention makes it possible to substantially increase the ratio between the diameter of the drill, i.e., the distance between the two minor cutting edges, to the dimension of the cutting insert in the longitudinal direction of the drill, preferably by a factor of approximately 2. It was demonstrated that the drill tip holder can be easily used in drilling tools that allow drilling depth of up to 7 times d.

Due to the fastening of its cutting insert, the drill according to the invention has substantial reserves regarding its stability. Consequently, it can be easily used for cutting very tenacious materials. In this case, the drill tip angle can be larger than 140°, but should amount to at least more than 130°.

It is preferred that the drill according to the invention be provided with a coolant channel that makes it possible to convey a coolant, e.g., a cutting emulsion, from the shaft end of the drill to the drill tip. This coolant channel is preferably arranged in the longitudinal axis of the drill, with said coolant channel being divided within the region of the drill tip such that two partial channels preferably exit within the region of the main free surfaces that are part of the shaft.

BRIEF DESCRIPTION OF THE DRAWINGS

The invention is described in detail below with reference to the figures. The figures show:

FIG. 5: a top view of the cutting insert according to FIG. 4, FIG. 6: a section of view taken along line VI—VI in FIG. 4, FIG. 7: a side view of the cutting insert according to the invention in the direction of the transverse axis.

BEST MODE FOR CARRYING OUT OF THE INVENTION

Figure 1:
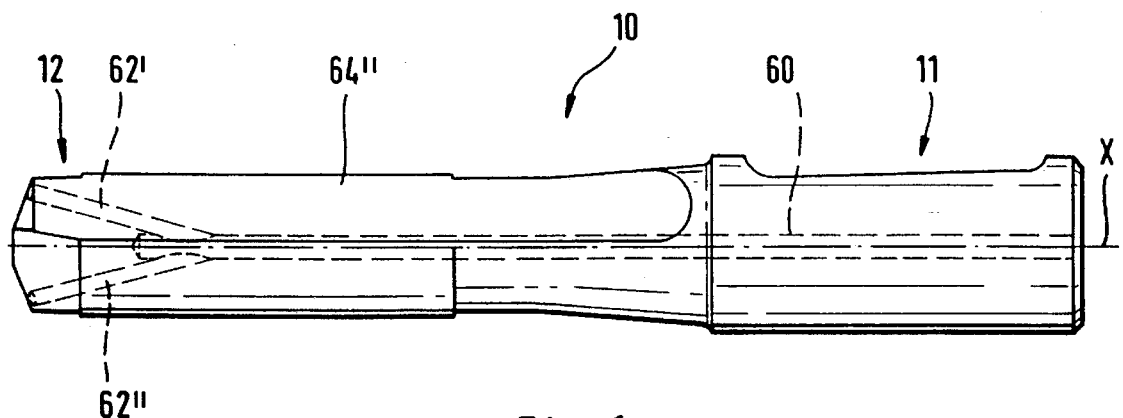
FIG. 1: a side view of the holder of a drill according to the invention.
Figure 3:
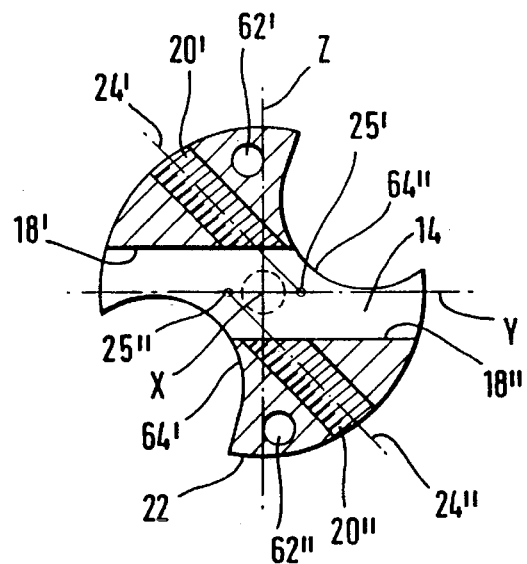
FIG. 3: a section of view taken through the drill tip of the holder along line III—III in FIG. 2, FIG. 4: a side view of a cutting insert according to the invention.
Figure 8:
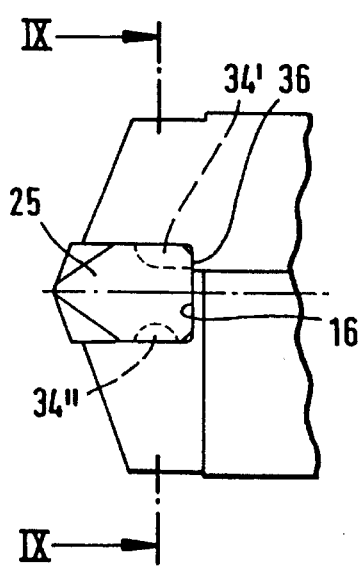
FIG. 8: a schematic representation of the cutting insert according to FIGS. 2 and 7 which is inserted into the groove of the holder.

FIG. 1 shows the holder 10 of a drill according to the invention. This holder has an essentially cylindrical shape with a longitudinal axis X and a transverse axis Y that is illustrated in FIG. 3 and extends perpendicular to the aforementioned longitudinal axis. The holder 10 comprises a shaft 11 and a drill tip 12.

Figure 2:
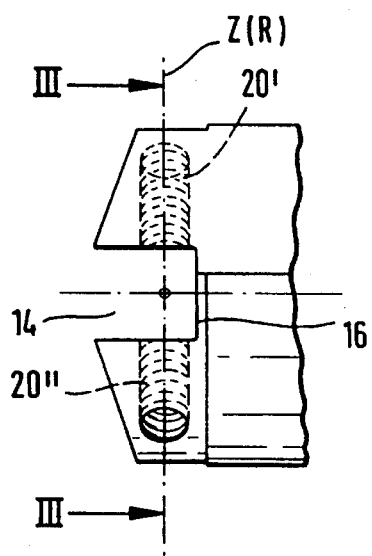
FIG. 2: a top view of the drill tip of the holder according to in FIG. 1.

FIGS. 2 and 3 show that a groove 14 with a groove bottom 16 and the groove side walls 18', 18" is arranged in the drill tip such that it extends along the transverse axis Y.

The transverse axis Y and the coordinate axis Z that extends perpendicular to the aforementioned transverse axis form a radial plane that is indicated in FIG. 2. Two threaded bores 20' and 20" that originate from the outer side 22 of the drill shaft and exit into the groove side walls 18' or 18" are arranged in this radial plane. The longitudinal axes 24' and 24" of the bores 18' and 18" are respectively arranged at an acute angle to the transverse axis Y or the groove side walls 18' and 18". The intersecting points 25', 25" between the longitudinal axes 24' or 24" and the transverse axis Y are respectively situated opposite to the bores on the other side of the longitudinal axis X of the holder 10.

The reference symbols S' and S" indicate the clamping forces that are exerted on a cutting insert 25 that is accommodated in the groove 14 in a positive fashion via the clamping and stopping elements 50' and 50". In the embodiment shown, the axes 24' and 24" lie in one common radial plane. However, it should be emphasized at this point that this alignment is not an essential prerequisite for realizing the function of the cutting insert holder according to the invention. The point-symmetric arrangement of the clamping and stopping elements illustrated in the figures is also not absolutely imperative, although it provides certain advantages with respect to manufacture, assembly and handling. FIG. 3 shows that the acute angle formed between the axis 241 or 24" and one groove side wall 18' or 18" is chosen in such a way that the clamping forces S" and S' transfer a moment M=S" x H onto the cutting insert 25, with said moment being directed opposite to the cutting direction RS of the drill. In other words, the clamping forces cause the cutting insert, during adjustment and fastening tightly, to press against the corresponding groove side walls 18' or 18" with its rear side surfaces 30' or 30".

FIGS. 4, 5 and 7 show three views of the cutting insert 25 to be inserted into the groove 14. FIG. 5 shows a top view of the cutting insert with two main cutting edges 26', 26" that are curved in concave fashion, two adjacent main free surfaces 28' and 28" as well as two rear side surfaces 30' and 30" that extend perpendicular to the plane of projection in FIG. 5. The view according to FIG. 4 shows the rear side surface 30' and the cutting surface 32" underneath the longitudinal axis X, with said cutting surface being part of the main cutting edge 26' and facing the observer.

FIG. 4 shows that a recess 34' that extends up to the back 36 of the cutting edge is arranged in the rear side surface 30'. Once the cutting insert and the holder are assembled, the back 36 of the cutting edge adjoins the groove bottom 16. The recess 34' has a planar support surface 38' that is manufactured by means of a cylindrical milling cutter as is the case with the side wall of the recess 34' and limited by an edge 40' in the form of a sector of a circle within a region that is situated opposite to the back 36 of the cutting edge.

A recess 34" that is illustrated by broken lines is arranged in the rear side surface 30" that is situated opposite to the observer in FIG. 4. This recess forms a support surface 38" limited by an edge 40" in the form of a sector of a circle and a linear edge piece 42".

FIG. 6 shows a section taken along line VI—VI in FIG. 4. The recess 38' is open toward the bottom perpendicular to the plane of projection, while the recess 38" is limited perpendicular to the plane of projection in FIG. 6.

FIG. 6 also shows that the lines normal to the support surfaces 38' and 38" which are illustrated by a dotted-dashed line in FIG. 6 extend at an acute angle to the transverse axis Y. This angle is identical to the angle at which the longitudinal axes of the bores 20' and 20" that are illustrated by dotted-dashed lines in FIG. 3 extend to the transverse axis Y or the groove side walls 18' and 18".

Figure 9:
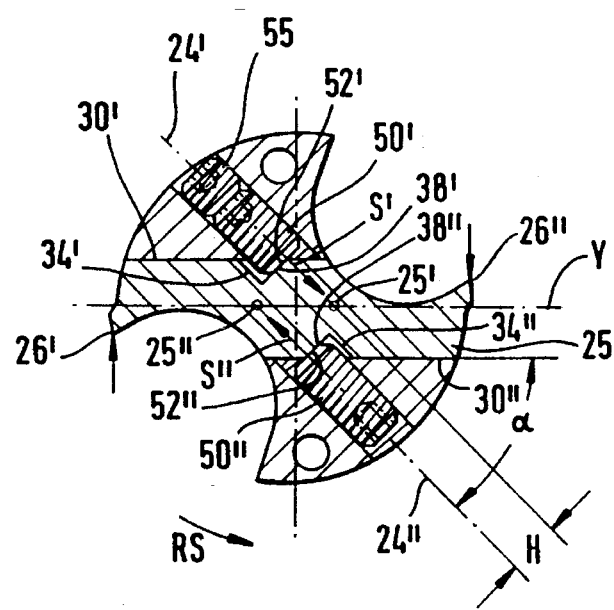
FIG. 9: a section of view taken along line IX—IX in FIG. 8.

FIG. 9 shows that stopping elements in the form of headless screws 50' and 50" which engage into the recesses 34' and 34" in the assembled condition. The headless screws 50' and 50", after insertion of the cutting insert, are screwed into the groove 14 until they adjoin the support surfaces 38' and 38". Due to the special arrangement of the longitudinal axes 24' and 24" of the bores 20' and 20", the headless screws turn the cutting insert shown in FIG. 9 in the clockwise direction, i.e., in the same direction as the cutting reaction forces that are indicated by the arrows and act on the main cutting edges 26' and 26". This causes the rear side surfaces 30' and 30" of the cutting insert to adjoin the corresponding groove side walls 18' and 18" within the outer region of the drill diameter such that the reaction forces that act on the main cutting edges 26' and 26" are withstood.

FIG. 9 also shows that the longitudinal axes 24' and 24" of the bores 20' and 20" are arranged at a somewhat greater distance from one another than the normal lines 39' a and 39" a to the support surfaces 38' and 38" (cf. FIG. 6), so that the end faces 52' and 52" of the headless screws 50', 50" only partially cover the support surfaces 38' and 38" of the cutting insert 25. This measure insures that a relative movement between the end faces of the headless screws that are provided with a right-handed thread and the respective support surface takes place while inserting said headless screws. In FIG. 9, this relative movement is directed downward in the direction of the longitudinal axis of the drill which extends perpendicular to the plane of projection, so that the cutting insert 25 is pressed against the groove bottom 16 with its back 36. In addition, it is possible to adjust or center the cutting insert 25 in the direction of the Y-axis by unscrewing one of the two headless screws 50' and 50" while screwing in the other headless screw. Once the centering or adjusting of the cutting insert is completed, one stopping element is secured by means of the counter[sunk] screw. This stopping element then cooperates with the recess 38' that extends up to the end face 36, so that this fixed stopping element can continuously remain inside the holder. This results in an asymmetric design of the cutting insert that consequently can only be inserted into the holder if it is properly oriented.

FIG. 9 elucidates one additional special feature of the object of the invention. This figure shows that the support surfaces 38' and 38" are, relative to the axes 24' and 24", arranged in such a way that the surface contact between the face sides of the headless screws 50' and 50– and the corresponding support surfaces 38' or 38" essentially only takes place on one side of the screw axes 24', 24". This means that frictional forces that are directed toward the bottom 16 of the groove are generated between the headless screw and the cutting insert during adjustment and clamping of the cutting insert. Consequently, a firm axial contact of the cutting insert in the bottom of the slot is insured during the adjustment and clamping process.

In the embodiment shown in the figures, the headless screw 50' is substantially shorter than the headless screw 50" such that an additional counter[sunk] screw 55 can be accommodated in the bore 20'. The counter[sunk] screw 55 is also realized with a hexagonal socket. After centering the cutting insert, the position of the headless screw 50' can be secured by tightening the counter[sunk] screw 55. Should it become necessary to replace the cutting insert 25, one need only loosen the headless screw 50 and unscrew it to such an extent that it no longer protrudes into the region of the groove 14. Since the recess 34' is realized in such a way that it is open in the direction toward the groove bottom 16 or the back 36 of the cutting insert, the cutting insert can be pulled out of the groove in the direction of the X-axis without having to loosen the headless screw 50' and the counter [sunk] screw 55.

on the other hand, the correspondingly designed recess 34" insures that the insert 25 cannot fall out of the groove 14 if the headless screw 50" is inserted.

The fastening elements which, according to the invention, are realized in the form of stopping elements or headless screws, engage on the respective rear side surfaces 30', 30" of the insert 25 such that bores that pass through the insert 25 can be eliminated. FIGS. 4 and 5 shows that it is possible to choose large ratios of the distance between two minor cutting edges 27' and 27" (=D) to the total dimension t of the cutting insert 25 in the direction of the X-axis for the cutting insert according to the invention. This ratio which is influenced by the tip angle amounts to approximately 2. The ratio D/t*, in which t* indicates the axial length of the guide diameter, can be increased by a factor of 3.5.

FIG. 1 shows that the holder 10 or the shaft 11 of the drill can be provided with a coolant channel 60 that is divided into two partial channels 62', 62" within the region of the drill tip 12. These two partial channels 62' and 62" respectively exit into one main free surface of the drill within the region between one respective flute 64", 64' and one respective bore 20', 20".

The drill according to the invention represents a drill with an interchangeable cutting insert which can be fabricated very easily with respect to the manufacturing technology, in which the cutting insert weakens the drill tip of the holder less intensely than in drill designs disclosed so far and consequently is more stable, and in which a required interchange of the cutting insert can be carried out in a simple and rapid fashion.

It goes without saying that modifications of the previously described embodiment are possible without deviating from the basic idea of the invention. The cutting insert is, for example, not limited to a point-symmetric design. It is, in principle, conceivable that the cutting edges extend differently although one particular advantage of the invention is attained if the thickness of the cutting insert is reduced within the region of the rake due to the specific extent of the cutting edges. In addition to hard metals, ceramic or cermet materials can also be used as materials for a the cutting insert. The cutting edge plate can be realized as a ground plate or simply as a sintered and consequently more inexpensive plate. The drill according to the invention is used for a drilling depth up to 7.5×d, where d represents the drill diameter.

We claim:

1. A drill, comprising:
    a cylindrical holder having a longitudinal axis and a transverse axis that extends perpendicular to said longitudinal axis,
    a drill tip inside of which a groove with a groove bottom and groove side walls is formed such that said groove extends along the transverse axis, and
    a cutting insert formed of a hard metal, said insert being located in the groove and having two main cutting edges that are arranged point-symmetric to the longitudinal axis, forwardly adjacent cutting surfaces and two rear side surfaces that are arranged opposite each respective cutting surface on the other side of the transverse axis wherein:
        the holder is provided with two bores that respectively exit into said groove side walls, said bores lying in one radial plane of the drill and being respectively arranged within a region of one of said rear side surfaces of the insert, and longitudinal axes of said bores respectively extending at an acute angle with respect to the respective groove side walls and the rear side surfaces of the insert,
        clamping and stopping elements are provided which respectively protrude out of one of the groove side wall and are arranged in the bores, at least one of the two stopping elements are one of movable and adjustable in the direction of the longitudinal axis of the bore, and recesses that form support surfaces that correspond to the stopping elements respectively are one of provided in and formed in the rear side surfaces of the insert.

2. A drill according to claim 1, wherein the bores extend at the same acute angle with respect to the respective groove side wall and the adjacent rear side surface of the insert.

3. A drill according to claim 2, wherein the longitudinal axes of the bores are positioned the same distance from the longitudinal axis of the holder of the drill.

4. A drill according to claim 1, wherein at least one of said stopping elements comprises a screw.

5. A drill according to claim 4, wherein the screw comprises a headless screw with a hexagonal socket head.

6. A drill according to claim 1, wherein at least one of the support surfaces comprises a planar surface.

7. A drill according to claim 6, wherein the planar support surface has a linear edge and an edge in the form of a sector of a circle, and wherein a cylindrical wall that extends perpendicular to the edge in the form of a sector of a circle and forms the second wall of the recess is situated adjacent the perpendicular edge.

8. A drill according to one of claims 6 or 7, wherein the recess extends up to the edge of the cutting insert that faces the groove bottom.

9. A drill according to claim 1 wherein the stopping elements comprise a headless screw and a countersunk screw that secures said headless screw.

10. A drill according to claim 1, wherein the recesses arranged on the rear side surfaces of the cutting insert and the support surfaces formed by the recesses are arranged offset relative to the bores such that the end faces that extend perpendicular to the longitudinal axes of the stopping elements and the support surfaces only partially overlap.

11. A drill according to claim 1, wherein the main cutting edges are curved in a concave fashion.

12. A drill according to claim 1, wherein the shaft of the drill is provided with two flutes that extend away from the drill tip.

13. A drill according to claims 11 or 12, wherein the cutting surfaces of the cutting insert are curved in a concave fashion and turn into flutes.

14. A drill according to claim 1, wherein the diameter of the drill is between 10 and 50 mm.

15. A drill according to claim 1, wherein the ratio of the diameter of the drill to the total dimension of the cutting insert in the longitudinal direction of the drill is approximately 2.

16. A drill according to claim 1, wherein the ratio of the diameter of the drill to the axial length of the guide diameter of the cutting insert is increased by a factor of 3.5.

17. A drill according to claim 1, wherein the tip angle is greater than 130°.

18. A drill according to claim 1, wherein a coolant channel is formed in the holder.

19. A drill according to claim 18, wherein the coolant channel is branched.

20. A drill according to claim 19, wherein the coolant channel extends in the longitudinal axis of the drill, and said coolant channel is divided into two partial channels within the region of the drill tip, with said partial channels exiting into the respective main free surface that is part of the holder within the region between one respective flute and the respective bores of the stopping elements.

21. A drill according to claim 2, wherein the forces transmitted on the cutting insert by the clamping and stopping elements generate a torque that is directed opposite the cutting direction of the drill.

* * * * *